United States Patent [19]
Stanton et al.

[11] 4,425,080
[45] Jan. 10, 1984

[54] GAS TURBINE ENGINE CASING

[75] Inventors: William A. Stanton, Thorneywood; Jonathan Hazlewood, Darley Abbey; Norman A. Kerridge, Little Eaton, all of England

[73] Assignee: Rolls-Royce Limited, London, England

[21] Appl. No.: 337,294

[22] Filed: Jan. 5, 1982

[30] Foreign Application Priority Data

Feb. 14, 1981 [GB] United Kingdom ................. 8104673

[51] Int. Cl.³ .............................................. F04D 29/40
[52] U.S. Cl. ...................................... 415/197; 415/9; 415/108; 415/217; 415/219 R; 416/2; 60/226.1
[58] Field of Search ................... 415/9, 108, 217, 218, 415/219 R; 416/2; 60/226 R; 138/147, 149; 156/92, 172, 187; 220/327

[56] References Cited
U.S. PATENT DOCUMENTS

| | | | |
|---|---|---|---|
| 2,999,667 | 9/1961 | Morley | 415/196 |
| 3,004,700 | 10/1961 | Warren | 415/219 |
| 3,542,152 | 11/1970 | Adamson | 60/226 R |
| 3,936,219 | 2/1976 | Holmes | 415/9 |
| 3,974,313 | 8/1976 | James | 415/9 |
| 4,038,118 | 7/1977 | James | 60/226 R |
| 4,377,370 | 3/1983 | Porcelli | 415/219 R |

FOREIGN PATENT DOCUMENTS 2037900 7/1980 United Kingdom ............ 415/219 R

Primary Examiner—Stephen Marcus
Assistant Examiner—John T. Kwon
Attorney, Agent, or Firm—Cushman, Darby & Cushman

[57] ABSTRACT

A containment ring for a gas turbine engine consists of a substantially rigid inner cylinder around the periphery of which is wound layers of fibrous material, a plurality of axially extending strips are located upon the outermost curved surface of the layers of fibrous material and are secured thereto by self-tapping screws.

12 Claims, 4 Drawing Figures

GAS TURBINE ENGINE CASING

This invention relates to a gas turbine engine casing and more particularly to an improved containment ring for use within or forming an integral part of such a casing.

The use of containment rings for gas turbine engines has been known for many years. It is necessary to provide containment rings such that in the event of a blade or rotating part of the engine becoming detached, such parts or blades will be prevented from passing through the engine casing by means of the containment ring, thus reducing the possibility of damage to the remainder of the engine or aircraft structure.

Containment rings have in the past been manufactured from metal, resin impregnated glass fibre or carbon fibre, or have simply consisted of layers of ballistic nylon or woven glass fibre tape etc. Such rings have suffered several disadvantages, in particular metal rings have to be manufactured from relatively thick section metal to ensure that they have adequate strength. This can result in a heavy structure which is particularly undesirable in the case of an aircraft gas turbine engine.

Composite material rings are obviously much lighter then metal ones, however because of the presence of the resin, energy absorption is confined to a localised area around the impact point with a result that only a small portion of the fibres within the ring actually take the strain.

Rings merely consisting of wound layers of ballistic nylon or woven glass fibres also suffer a disadvantage in that because the absence of the resin the loads caused by an impact may be shared out through a greater number or length of fibres, however the individual fibre layers tend to be pushed apart by a missile and thus allow it to penetrate the casing.

An object of the present invention is to provide a containment ring for a gas tubine engine in which the aforementioned disadvantages are substantially eliminated.

According to the present invention a containment ring for a gas turbine engine comprises a substantially rigid cylinder around the periphery of which is wound a plurality of layers of fibrous material, and a plurality of axially extending strips located on the outermost curved surface of the layers of fibrous material which strips are secured to the layers of fibrous material by fastening means extending into said layers said strips also being secured to adjacent fixed structure.

Preferably the axially extending strips are equally spaced about the outermost curved surface of the layers of fibrous material.

Furthermore the fibrous material consists of an aromatic polyamide fibre woven into an elongate tape.

Alternatively the fibre may comprise glass fibre, carbon fibre, or metallic fibre which is woven into suitable tape.

Preferably the fastening means extending into the fibrous layer comprise self tapping screws.

Preferably the strips are secured adjacent their ends to adjacent portions of the engine casing.

Furthermore the substantially rigid cylinder comprises a relatively thin section lightweight metal structure or alternatively it may be manufactured from fibre reinforced resin composite material.

According to a further aspect of the present invention the plurality of layers of woven fibrous material are covered with an impervious layer of material, which impervious layer may comprise a resin layer or alternatively a metallic or non-metallic skin.

For better understanding thereof an embodiment of the invention will now be more particularly described by way of example only and with reference to the accompanying drawings in which.

Figure 1:
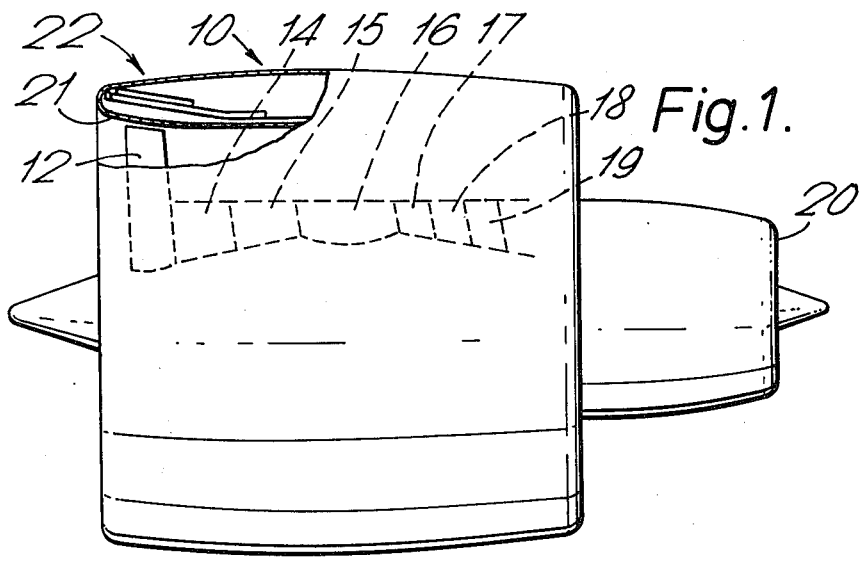
FIG. 1 shows a pictorial side view of a ducted fan type gas turbine engine having a broken away casing portion showing a diagramatic embodiment of the present invention.
Figure 2:
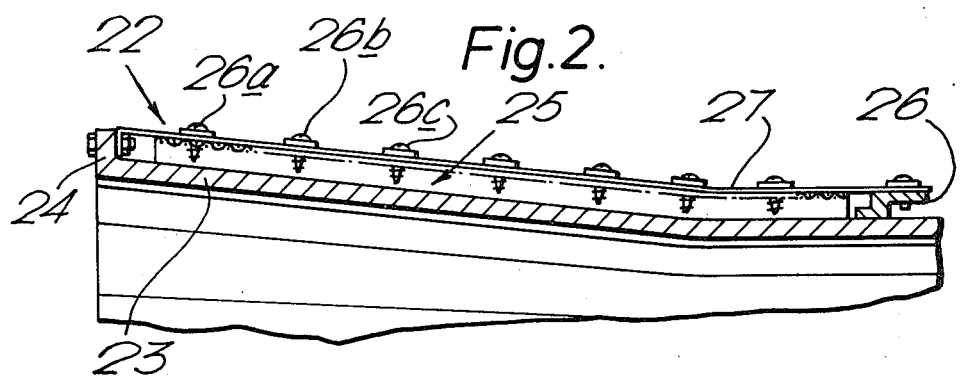
FIG. 2 shows an enlarged cross-sectional view in greater detail of a portion of that shown diagramatically at FIG. 1.
Figure 3:
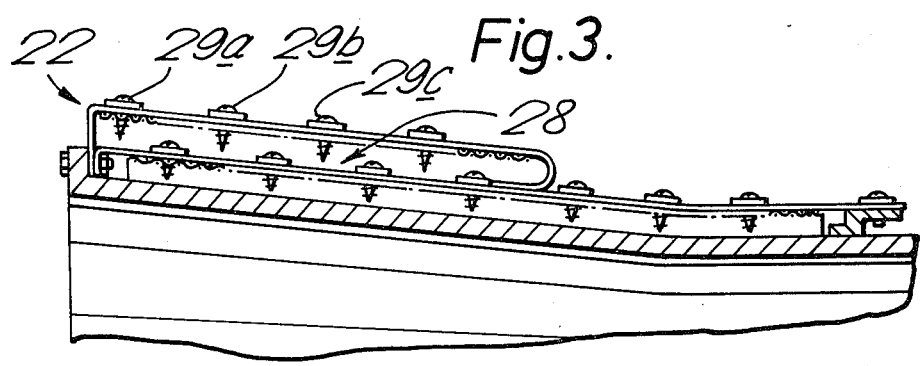
FIG. 3 shows a further enlarged view in greater detail showing the complete portion shown diagramatically at FIG. 1.
Figure 4:
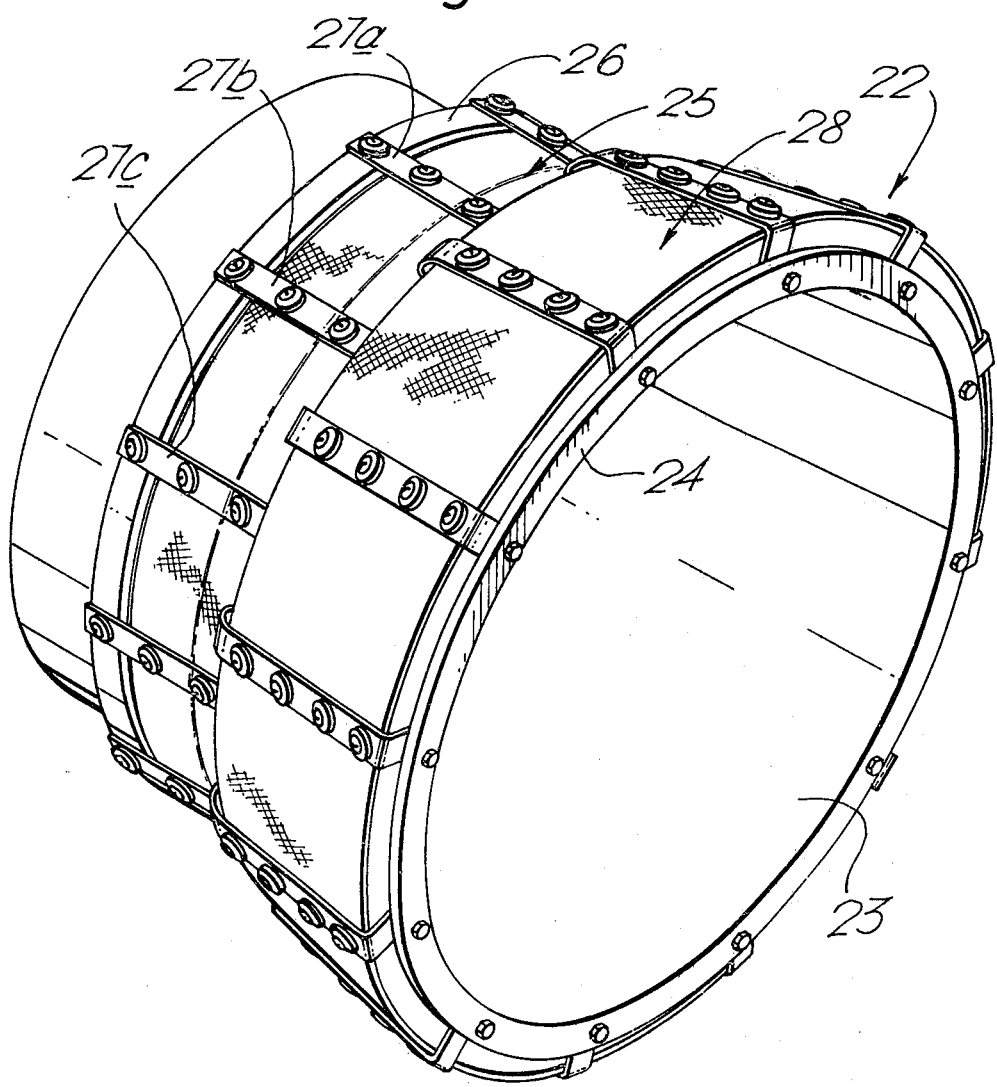
FIG. 4 is a perspective view of the containment ring including the rigid cylinder, the layers of fibrous material, the strips, and the fastening means.

Referring to the drawings a ducted fan type gas turbine engine shown generally at 10 comprises in flow series a fan 12, an intermediate pressure compressor 14, a high pressure compressor 15, combustion equipment 16, and high, intermediate and low pressure turbines indicated at 17, 18 and 19 respectively, the engine terminating in an exhaust nozzle 20.

Provided radially outwardly of the fan 12 is located a fan duct 21 which is connected to the remainder of the engine by radially extending struts not shown in the drawings. Within the fan duct assembly 21 is provided a containment ring shown generally at 22 arranged radially outwardly of the fan 12, the ring being located such that in the event of a blade or disc failure the broken blade or disc portion, or portions will be contained within the engine casing, or alternatively the energy of the portion will be reduced to an acceptable level.

The containment ring shown generally at 22 comprises a relatively thin section substantially rigid cylinder 23 including a flanged end 24. The cylinder 23 may be manufactured from metal such as for example, steel, a nickel alloy; titanium, or alternatively a fibre reinforced resin composite structure which may be manufactured by any of the well known weaving, winding or laying up techniques.

A plurality of layers of woven or knitted material shown generally at 25 are wound round the outer periphery of the cylinder 23. To facilitate the winding, the free end of the material may be bonded to the cylinder 23 with a suitable adhesive. Furthermore the outermost free end of the knitted material may be similarly bonded.

The cylinder 23 is also provided with end stops 26 at its end opposite to the flange 24 to which the strips 27 are attached, the strips therefore serving to prevent the wound layers of material moving down the tapered surface of the cylinder. The wound up layers of material consist of a continuous length of tape which in the preferred embodiment of the invention is woven from an aromatic polyamide fibre. The fibre which appears most suitable for the present purposes is that made by Du Pont Limited and sold under the Registered Trademark KEVLAR, the invention however is not intended in any way to be restricted to such a type of tape.

After the outermost free end of the last outermost layer of woven material has been bonded to its adjacent layer, the respective layers of woven material are secured together by means of fixing means consisting of self tapping screws 26a, 26b, 26c, etc. which are driven into the wound up material layers and serve to secure the plurality of metal strips 27a, 27b, 27c, etc. to them. Furthermore the respective ends of the strips 27a, 27b, 27c, etc. are secured at their ends by means of bolts to the flange 24 and stops 26.

A further plurality of layers of material shown generally at 28 are then wound over the material 25 and strips 27, this layer is also similarly bonded together at its respective end as the fibrous material layers 25. A further plurality of metal strips 29 are then secured to the outermost surface of the material 28 by means of further self tapping screws 29a, 29b, 29c etc. Furthermore the most downstream end 30 of the strips are turned under the layers of material 28 and their upstream most ends are secured by bolts to the flange 24.

It will be appreciated that as a result of two sets of self tapping screws 26 and 29 the majority of separate layers of material shown generally at 25 and 28 are secured with respect to each other and the strips. In this way if the cylinder 23 is struck by a portion of a fan blade 12 or some other debris the force of the impact will punch a hole through the rigid cylinder 23 and the debris will be caught by the layers of material, the elasticity of which will absorb the remainder of the impact. It will be appreciated that when the material layers are subjected to an impact they will deform, it is therefore essential that the strips are made sufficiently ductile to withstand such deformation and thus ensure that the material remains substantially in its preferred axial location.

We claim:

1. In a gas turbine engine having a duct defining fixed structure and at least a rotating part positioned within the duct, the improvement of a containment ring carried by said duct and positioned radially outwardly of said rotating part for absorbing energy and retaining a missile thrown radially outwardly by said rotating part, said containment ring comprising:

a substantially rigid cylinder coaxial with and carried by said duct, said rigid cylinder having an inner periphery and an outer periphery;

a fibrous material having one end bonded to the outer periphery of said rigid cylinder and being wound around said rigid cylinder to define a plurality of layers, said fibrous material having another end bonded to an adjacent one of said layers, and said layers having an outermost curved surface;

a plurality of axially extending and circumferentially spaced strips positioned upon the outermost curved surface of said plurality of layers;

fastening means extending into said layers of fibrous material and securing said strips thereto; and second fastening means securing said strips to adjacent fixed structures.

2. In a gas turbine engine as claimed in claim 1 in which the axially extending and circumferentially spaced strips are equally spaced about the outermost curved surface of the layers of fibrous material.

3. In a gas turbine engine as claimed in claim 1 in which the fibrous material consists of aromatic polyamide fibre woven into an elongate tape.

4. In a gas turbine engine as claimed in claim 1 in which the fibrous material may be from any one of the group consisting of glass fibre, carbon fibre, and metallic fibre which is woven into suitable tape.

5. In a gas turbine engine as claimed in claim 1 in which the fastening means extending into the fibrous material layers consist of self-tapping screws.

6. In a gas turbine engine as claimed in claim 1 in which the strips are secured adjacent their ends by said second fastening means to adjacent fixed structure of said duct.

7. In a gas turbine engine as claimed in claim 1 in which the substantially rigid cylinder comprises a relatively thin section lightweight metal structure.

8. In a gas turbine engine as claimed in claim 1 in which the substantially rigid cylinder is manufactured from fibre reinforced resin composite material.

9. In a gas turbine engine as claimed in claim 1 in which the plurality of layers of fibrous material are covered with an impervious layer of material, which impervious layer of material may consist of a resin layer.

10. In a gas turbine engine as claimed in claim 1 including an impervious layer of material covering said plurality of layers of fibrous material, said impervious layer of material being metallic.

11. In a gas turbine engine as claimed in claim 1 wherein said duct is a fan duct and wherein said rotating part is a fan.

12. In a gas turbine engine as claimed in claim 1 wherein said plurality of layers of fibrous material is wound from a woven tape.

* * * * *